Feb. 10, 1925.
A. A. SCHWARTZ ET AL
HICKEY AND METHOD OF MAKING SAME
Filed Aug. 27, 1921
1,525,662
2 Sheets-Sheet 1
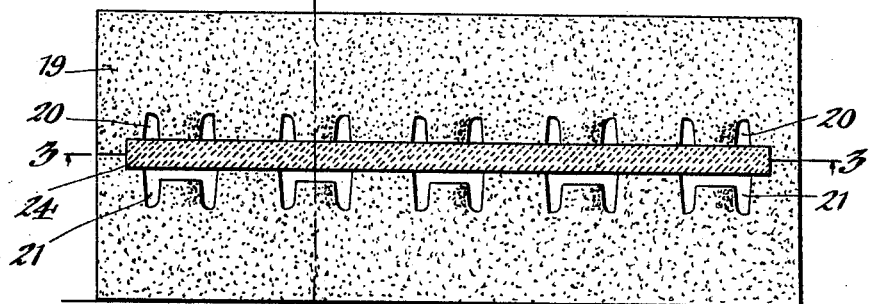
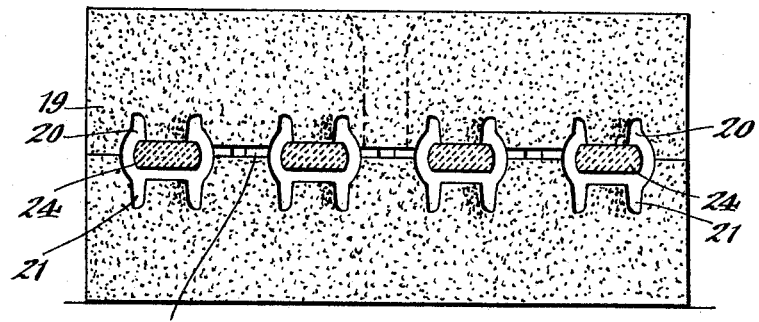
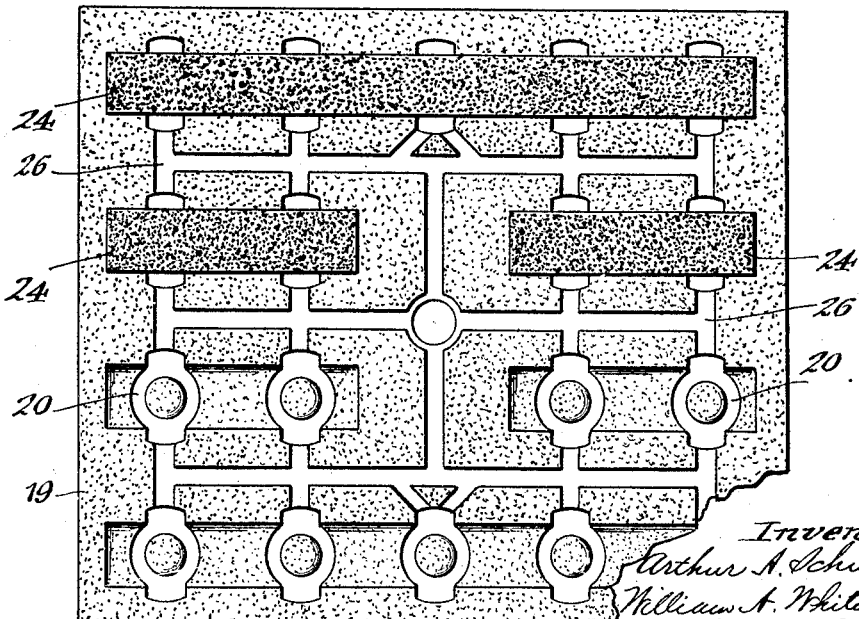
Inventors,
Arthur A. Schwartz,
William A. Whiteside,
by Geyer Popp
Attorneys.

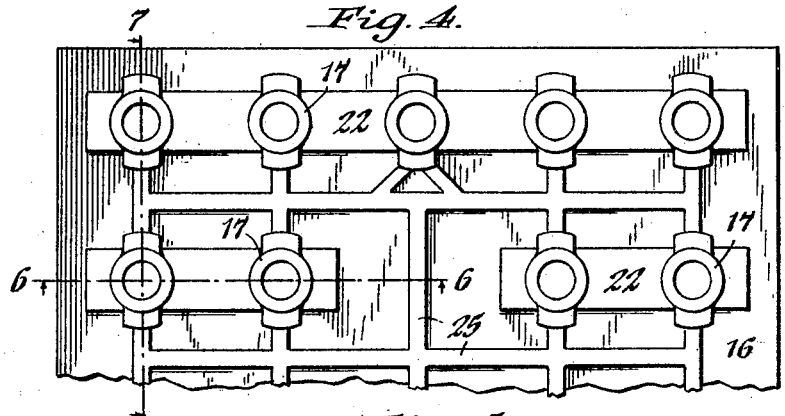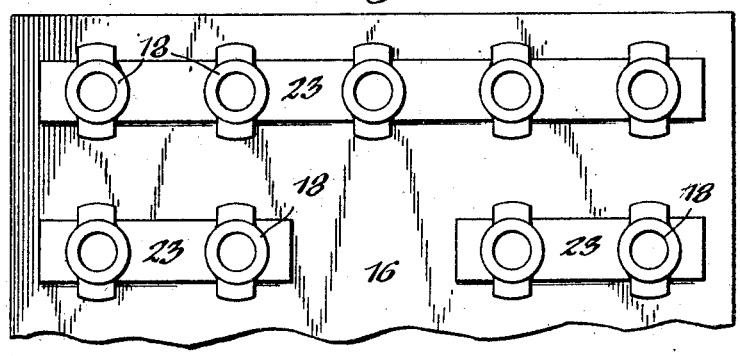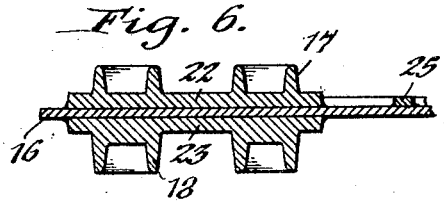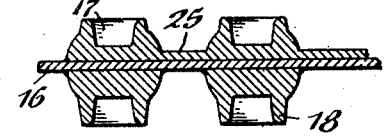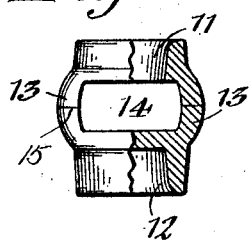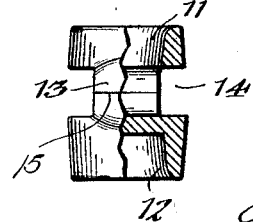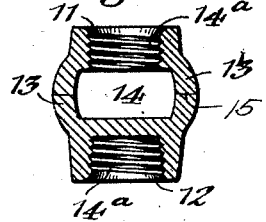

Patented Feb. 10, 1925.

1,525,662

UNITED STATES PATENT OFFICE.

ARTHUR A. SCHWARTZ AND WILLIAM A. WHITESIDE, OF BUFFALO, NEW YORK, ASSIGNORS TO M. S. W. MANUFACTURING COMPANY, INC., OF BUFFALO, NEW YORK, A CORPORATION OF NEW YORK.

HICKEY AND METHOD OF MAKING SAME.

Application filed August 27, 1921. Serial No. 496,035.

*To all whom it may concern:*

Be it known that ARTHUR A. SCHWARTZ, a citizen of the United States, and WILLIAM A. WHITESIDE, a citizen of Canada, both residing at Buffalo, in the county of Erie and State of New York, have invented new and useful Improvements in Hickeys and Methods of Making Same, of which the following is a specification.

This invention relates to an improved hickey and a method of casting the same.

Such hickeys ordinarily comprise a tubular body provided at its ends with internally tapered and screw threaded collars or sockets for receiving the threaded ends of pipes which enclose the feed wires of an electric fixture, and between said collars with a transverse central opening extending from side to side of the hickey-body, through which such wires pass.

The object of our invention is to mold and core hickeys of this kind in such a manner that their end holes or collars will be cast smooth, thus facilitating the operation of machining or screwthreading the hickeys, and effecting an important saving of time and a corresponding reduction in their cost of production, as well as lessening wear and breakage of the machine tools.

In the accompanying drawings: Figure 1 is a vertical longitudinal section of a mold for making the hickeys, showing a gang of mold cavities and a core placed therein, preparatory to pouring the mold. Figure 2 is a cross section on line 2—2, Fig. 1. Figure 3 is a horizontal section on line 3—3, Fig. 1. Figure 4 is a fragmentary plan view of the gate-side of a pattern-plate for molding the articles. Figure 5 is a similar view of the opposite face of the pattern plate. Figures 6 and 7 are transverse sections on the correspondingly numbered lines of Fig. 4. Figure 8 is a sectional elevation of one of the cast hickeys before being machined. Figure 9 is a similar view at right angles to that of Fig. 8. Figure 10 is a longitudinal section of one of the finished hickeys.

Similar characters of reference indicate corresponding parts throughout the several views.

Referring to Figs. 8, 9 and 10, the end collars or sockets of the hickey are indicated at 11 and 12, the same being rigidly connected by the customary longitudinal webs or arms 13 cast in one piece therewith and forming the transverse opening 14 between them. These collars are cast with the usual internal taper to facilitate drawing them from the mold, the same being finally tapped, as shown at 14$^a$. In the example shown in the drawings, the upper collar 11 is open at both ends, while the lower one 12 is blind or closed at its inner end, but if desired, both of them may be open at both ends.

In practicing our improved method, the hickeys or hickey-blanks, instead of being cast in a horizontal position in the mold with a longitudinal joint or parting line, as hitherto, are cast in a vertical position with a transverse central joint or parting line 15, and the end collars are molded in green sand, while the center opening 14 is cored with dry sand. For this purpose, and to expedite production, the hickeys are molded and cast in gangs by the use of a pattern plate 16, preferably constructed as shown in Figs. 4-7. This plate is provided on one side with cup-shaped projections 17 for molding the upper hickey-collars 11 and on its opposite side with similar cups 18 for molding the lower collars 12. When the pattern plate is placed in the green-sand mold 19, its cups produce upper collar-molding cavities 20 and similar lower cavities 21. The pattern plate is also provided on its upper and lower sides with raised ribs or bridges 22 and 23, respectively, which connect the gangs of cups 17 and 18 and produce corresponding cavities in the mold which receive the dry sand cores 24 which intersect said collar-molding cavities, leaving the transverse center opening 14 in the hickey or hickey-blanks when cast. On its lower face, the pattern-plate also has the customary additional ribs 25 for forming the gates 26 in the mold.

By thus molding the collars of the hickeys in green sand and coring the central openings with dry sand, the inner walls of the collars are cast with a smooth surface which can be tapped or machined more easily and in much less time than collars cast with rough interiors, such as produced by dry sand cores.

Moreover, by casting the hickeys on their ends with a transverse parting line, instead of on their sides with a longitudinal parting line, a larger number can be cast in each mold at a time, with the same labor, because a larger number of patterns can be placed in a given area of the pattern plate.

This method has the further advantage that less metal is required for the connecting webs or arms, because they may be substantially flat on their inner sides, as shown in Figs. 8, 9 and 10, their outer convex sides being in a good drawing position in the green sand. In hickeys which are cast on their sides, there must be draft on both sides of the webs and they must therefore be convex on their inner as well as their outer sides, requiring additional metal which is saved by the present invention.

This method also permits the use of a single core for casting a plurality of hickeys. This requires fewer cores to be handled and placed in the mold; permits a single sized core to be used for various sized hickeys, whereas, by casting them on their sides, different sized cores must be used for different sized hickeys; and also requires less exactness in placing cores because they are supported at different points along their length, instead of only in the middle as is the case with cores placed in the ends of hickey-molds.

The additional advantage is gained of materially reducing the wear and breakage of the tools employed for machining the hickeys, keeping them in better condition and requiring less frequent sharpening thereof.

It has been demonstrated that by the use of this improved method, a saving of from fifty to seventy-five per cent is effected over the methods hitherto practiced in the manufacture of such articles.

We claim as our invention;

1. A cast hickey-blank, having a transverse parting line and end collars having smooth inner sides.

2. A cast hickey blank, having a transverse central opening, end collars arranged on opposite sides of said opening and a transverse parting line intersecting said opening, said collars having smoothly-cast inner sides.

3. A cast hickey-blank having end collars and spaced arms connecting said collars and forming an intervening transverse opening, said arms being substantially flat on their inner sides.

4. The hereindescribed method of casting a hickey-blank having a transverse central opening, end collars arranged on opposite sides of said opening, and a transverse parting line intersecting said opening, which consists in moulding said collars in green sand and coring the central opening with dry sand.

5. The hereindescribed method of casting a hickey-blank having a transverse central opening, end collars arranged on opposite sides of said opening, and a transverse parting line intersecting said opening, which consists in moulding both the inner and outer sides of said collars in green sand and coring the central opening with dry sand.

6. The hereindescribed method of casting a hickey-blank having a transverse central opening, end collars arranged on opposite sides of said opening, and a transverse parting line intersecting said opening, which consists in moulding said collars in green sand, whereby they are cast with smooth inner sides and machining thereof is facilitated.

ARTHUR A. SCHWARTZ.
WILLIAM A. WHITESIDE.